UNITED STATES PATENT OFFICE.

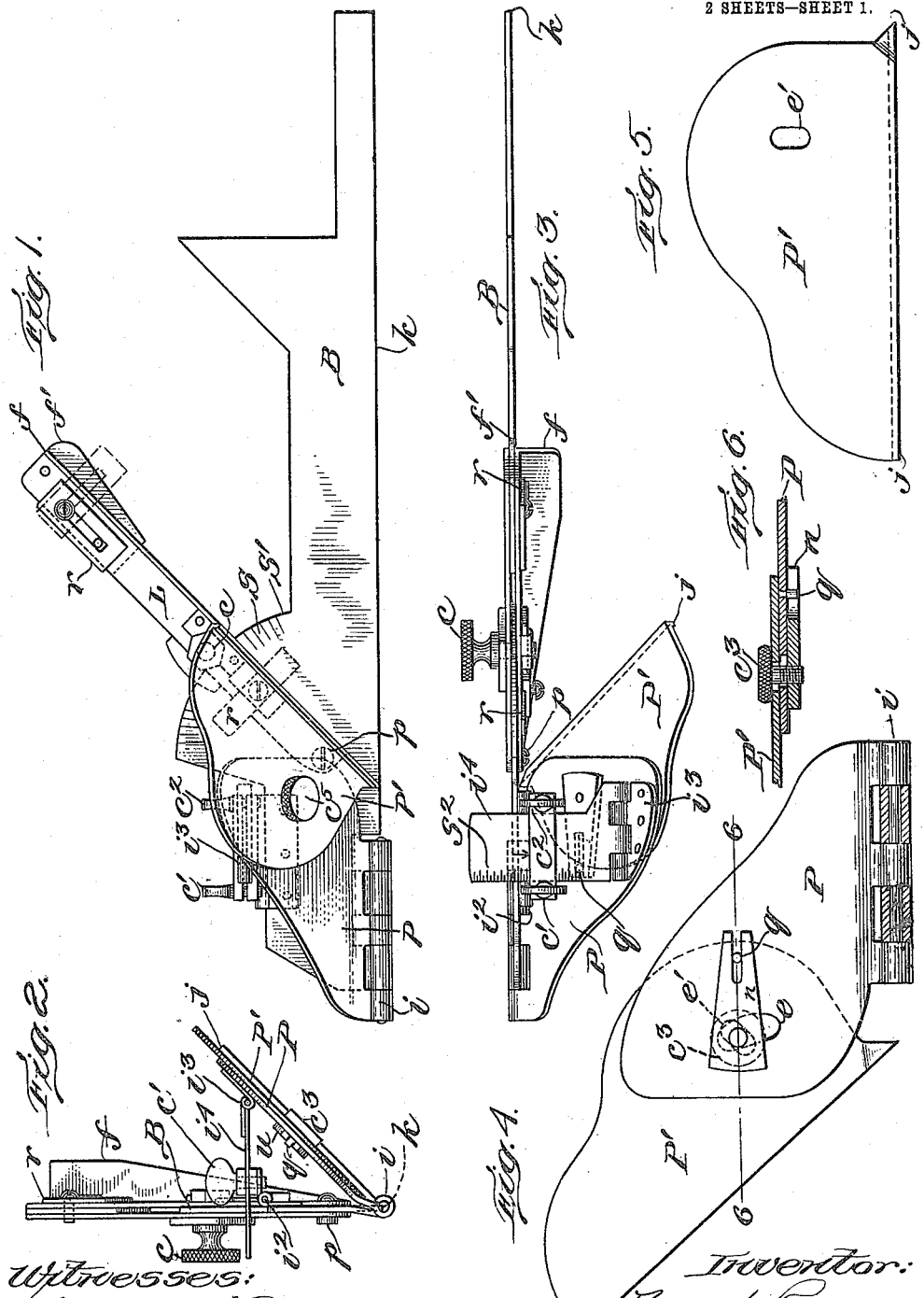

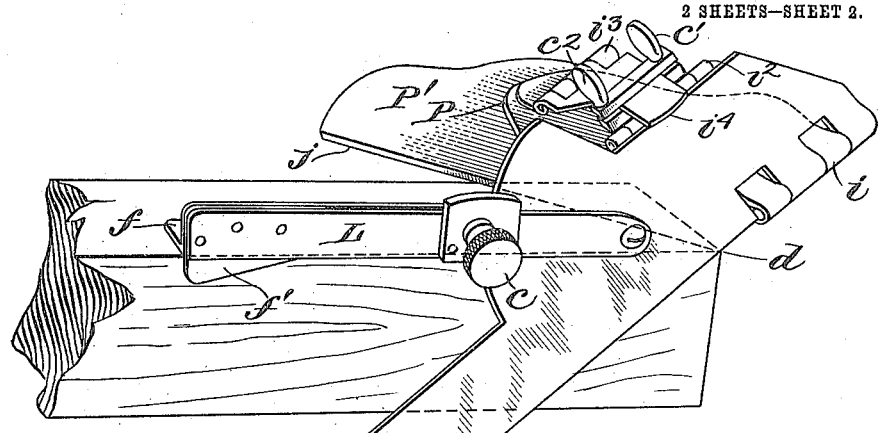

REUBEN M. RAYMOND, OF MALDEN, MASSACHUSETTS.

CARPENTER'S GAGE.

1,136,367.

Specification of Letters Patent.

Patented Apr. 20, 1915.

Application filed February 24, 1914. Serial No. 820,710.

*To all whom it may concern:*

Be it known that I, REUBEN M. RAYMOND, a subject of the King of Great Britain and Ireland, and resident of Malden, in the county of Middlesex and State of Massachusetts, have invented new and useful Improvements in Carpenters' Gages, of which the following is a specification.

My invention relates to carpenters' gages, and more particularly consists in a three dimension gage for bevel gaging purposes by which joiners will be assisted in making accurate bevel joints.

In the drawings hereto annexed which illustrate an example of my invention,—Figure 1 is a side elevation of the gage; Fig. 2 is an end elevation; Fig. 3 is a top plan view; Fig. 4 shows the solid angle bevel member on a larger scale; Fig. 5 is a side view of the adjustment plate of the solid angle bevel member; Fig. 6 is a cross section of the hinge and adjustment plates of the solid angle bevel member and the nut plate, keeper and nut securer, taken at the line 6—6, Fig. 4; Fig. 7 is an illustration in perspective of the application of the gage; Fig. 8 is a plan of a roof showing simple, hip, and jack rafters; and Fig. 9 is an illustration of the cuts of a hip rafter.

Similar reference letters indicate corresponding parts in all the figures of the drawings.

The device, made of brass or other suitable material consists of a straight-edge piece B, called the base to which is pivotally attached the plane-angle bevel member L. In the form of the device herein described, both the plane-angle and solid-angle members are adjustable. L is attached to B by means of a pivot $p$, so that it is angularly adjustable in the plane of the base B. The angle at which L may be fixed is to be found on the scale S marked on the quadrant S'. The plane-angle bevel member L has flanges $f$ and $f'$, $f$ lying in a plane at right angles to the common plane of the bevel member L and base B, and $f'$, in the said plane. The bevel member L is further provided with attachments $r$ and $r$ which are adapted to protrude through apertures in the flange $f$ so as to make possible the use of the device upon uneven surfaces. The bevel member L is provided with the set screw $c$ in order to clamp the said member at any desired angle indicated by the scale S.

The solid-angle bevel member is made up of two plates P and P'. In the form of the device herein shown the plate P is attached to the base B by a hinge arrangement $i$. The turning axis of the hinge $i$ coincides with the line of the lower edge $k$, herein called the gaging edge of the base B, geometrically projected. By the "gaging edge $k$" is meant that edge or corner of the base which runs lengthwise of the gage and is on the same side of the base as the solid-angle bevel member. The plate P is also adjustably attached to the base B by means of hinges $i^2$ and $i^3$, and the bar $i^4$ on which is marked the scale $S^2$. Set screws $c'$ and $c^2$ serve to clamp fast the bar $i^4$, and therefore the plate P, at any desired angle to the plane of the base B. Instead of terming this plane as the plane of the base B, it may be described as the plane common to the base B and the bevel member L. The construction of the adjustable solid-angle bevel member should be such that, at whatever angle the plate P is disposed to the plane of the base B, the plate P' may be so adjusted that its gaging edge $j$, if geometrically projected, will intersect the gaging edge $k$.

The second or adjustment plate P' of the solid-angle bevel member is entirely detachable in the form of the device as herein shown. It is provided with a gaging edge $j$ in the flange form herein illustrated. This adjustment plate P' should have considerable scope to its angular movement of adjustment in respect to the plate P. This is necessary in order to bring the straight edge $j$ into the same plane with the flange $f$ of the bevel member L whatever may be the solid-angle between the plate P and base B. This wide range of movement of the plate P' in relation to the plate P, is secured by arranging the oblong holes $e$, $e'$ in the plates P, P' respectively, at an angle to each other, and by providing the nut plate $n$, the keeper $q$ and the screw securer $c^3$ to bind the plates P, P' together in any position. While the oblong form of hole is preferable, this form is not essential. The nut plate $n$ is provided with a slot. In this slot lies the keeper $q$ which is fixed to the inner side of plate P; while a wide range of movement is provided for, the keeper will serve its function of preventing the nut plate from turning. By means of the nut securer $c^3$, a firm clamping of the plates P, P' is obtained.

The mode of operation of the gage will be explained as applied to the work of cutting rafters; but the same principles of operation apply in the use of the device whatever may be the joint to be made.

The method of using the device is as follows: In making the "down cut" (i. e. the cut which abuts against the ridge pole in the simple roof rafter), the device is used as an ordinary two dimension or plane-angle bevel, using only the base B and the bevel member L. The bevel member L is secured at the proper angle to the lower edge $k$ of the base B by its set screw $c$. This angle is found from the plan of the structure and corresponds to the pitch of the roof. On the scale S the various angles are marked. The gage is then applied (Fig. 7) to a rafter in such a manner that the flange $f$ of the bevel member L will rest on top of the rafter and the intersection point of the geometrically projected gaging edge of the first bevel member L, and the gaging edge $k$ of the base B will coincide with the corner of the rafter as at $d$. The edge of the base B will then indicate the line of the down cut $d—t$.

In making the cut of a hip, jack or valley rafter the base B, the bevel L and the solid-angle bevel member P, P' are used, three dimensions being involved. (For the hip rafter H, jack rafters J, and simple rafters R, see Fig. 8). Before applying the gage the plane-angle bevel member L is adjusted in relation to the base B, as above indicated, to determine the down cut of the hip rafter. The angle in this case will not be that of the pitch of the roof (as in the case of the simple rafter R) but will be found from the plans or calculated as explained in books on carpentry. The plate P of the solid-angle bevel member is then set by means of the set screws $c'$, $c^2$ at an angle equal to the angle M O N (Fig. 8). This angle can be taken from the house plans; it is ordinarily forty-five degrees, being one-half of the angle of the roof plates which in turn are usually right angled. An example of a form of roof where the angle M O N would be less than forty-five degrees and a form frequently adopted, is the octagon roof. The scale $S^2$ on the bar $i^4$ is marked so as to give whatever angle may be desired. Then the plate P' is set so that its straight edge $j$ lies in alinement with the flange $f$ of the first bevel member L; or in other words, so that the gaging edge of the plate P' lies in the same plane with the flange $f$ of the bevel member L. Having adjusted the gage as just explained, it is applied to the corner of a rafter in the same manner as set forth for making the down cut of the simple rafter. Thus, it will be found that the gaging edge, $j$, of the plate P' will rest upon the top of the rafter and will indicate the cut $d—u$ (Fig. 9) which is the second cut that is essential to make the hip rafter abut in close fit against the ridge pole.

My invention is characterized by the employment of a bevel adapted to measure plane angles, with a bevel adapted to measure solid angles about one of the gaging edges of the plane-angle bevel, and by the consequent definition of plane angles between that gaging edge of the plane-angle bevel and a gaging edge upon the angularly movable member of the solid-angle bevel.

By means of the members, $r$ $r'$, of the first bevel member, L, the gage can be used upon a round as well as upon a plane surface. In the case of a round surface, $r$ and $r'$ are loosened and are then caused to extend down through the flange, each the same distance.

The characteristic combination of plane-angle and solid-angle bevel members with a gaging base may be embodied in a form wherein either or both bevel members are fixed, if some standard angles only are contemplated and adjustability is therefore not required. This condition will practically be found in cases where the bevel members of a gage such as herein described are set, once for all, for a line of work which calls for no variations in adjustment.

I claim:

1. In a gage, the combination of a base provided with a gaging edge, a plane-angle bevel member mounted on the base, and a solid-angle bevel member rotatably adjustable with relation to the base about the line of said gaging edge as an axis, and provided with a gaging edge which, if geometrically projected, passes through the angle formed by the plane-angle bevel and the gaging edge of the base.

2. In a gage, the combination of a base provided with a gaging edge, a plane-angle bevel member pivotally mounted on the base, and a solid-angle bevel member provided with a gaging edge, which, if geometrically projected, passes through the angle formed by the plane-angle bevel and the gaging edge of the base, the plane of the solid angle bevel member being angularly adjustable with respect to the plane common to the base and the plane angle bevel member.

3. In a gage, the combination of a base, a plane-angle bevel member angularly adjustable with relation to and in the plane of the base, and a solid-angle bevel member whose plane is adjustable with relation to the base to positions angularly disposed to the plane common to the base and plane-angle bevel member.

4. In a gage, the combination of a base, a plane-angle bevel member pivoted to the base and angularly adjustable in the plane of the base and a solid-angle bevel member comprising mutually angularly adjustable plates, said second bevel member being mounted on the base and having its plane adjustable to positions angularly disposed to the plane common to the base and first named bevel member.

5. In a gage, the combination of a base, a plane-angle bevel member pivoted to the base and angularly adjustable in the plane of the base and a solid-angle bevel member comprising mutually angularly adjustable plates, said solid-angle bevel member being mounted on the base and having its plane adjustable to positions angularly disposed to the plane common to the base and plane-angle bevel member, a slotted nut plate, a keeper therefor, a screw securer engaging said nut plate for the plates of the solid-angle bevel member, said plates being provided with slots and said slots being at an angle to each other.

6. In a gage, the combination of a base, a plane-angle bevel member pivoted to the base and angularly adjustable in the plane of the base, and a solid-angle bevel member comprising mutually angularly adjustable plates, said solid-angle bevel member being hinged to the base and its plane being adjustable to positions angularly disposed to the plane common to the base and plane-angle bevel member.

7. In a gage, the combination of a base, a plane-angle bevel member pivoted to the base and angularly adjustable in the plane of the base, and a solid-angle bevel member comprising mutually angularly adjustable plates, said solid-angle bevel member being pivotally mounted to turn on an axis coincident with the gaging edge of the base and adjustable to positions angularly disposed to the plane common to the base and plane-angle bevel member.

8. In a gage, the combination of a base, a plane-angle bevel member pivoted to the base and angularly adjustable in the plane of the base, and a solid-angle bevel member comprising mutually angularly adjustable plates, said solid-angle bevel member being pivotally mounted to turn on an axis coincident with the gaging edge of the base and adjustable to positions disposed to the plane common to the base and plane-angle bevel member, a slotted nut plate, a keeper therefor, a screw securer engaging said nut plate and fastening it to the plates of the solid-angle bevel member, said plates being provided with slots and said slots being at an angle to each other.

9. In a gage, the combination of a base, a plane-angle bevel member pivoted to the base and angularly adjustable in the plane of the base, and a solid-angle bevel member, comprising mutually angularly adjustable plates, one of which plates is pivotally mounted to turn on an axis coincident with the gaging edge of the base and adjustable to positions angularly disposed to the plane common to the base and plane-angle bevel member, one of said plates pivotally attached to the other plate.

10. In a gage, the combination of a base, a plane-angle bevel member pivoted to the base and angularly adjustable in the plane of the base, and a solid angle bevel member, comprising mutually angularly adjustable plates, one of said plates being pivotally mounted to turn on an axis coincident with the gaging edge of the base and adjustable to positions angularly disposed to the plane common to the base and plane-angle bevel member, the second of said plates being adjustable to positions in which the line of its outer edge intersects the line of the gaging edge of the base.

11. In a gage, the combination of a base, a plane-angle bevel member pivoted to the base and angularly adjustable in the plane of the base and a solid-angle bevel member comprising two plates, one of said plates being mounted on the base in position angularly disposed to the plane common to the base and plane angle bevel member and the other of said plates being pivotally attached to the first plate, and adjustable to positions in which the line of its outer edge intersects the line of the gaging edge of the base.

12. In a gage, the combination of a base, a plane-angle bevel member pivotally mounted on the base at an angle thereto, a solid-angle bevel member comprising two plates one of which is pivotally mounted with relation to the base to turn on an axis coincident with the gaging edge of the base and adjustable to positions angularly disposed to the plane common to the base and plane-angle bevel member, the other of said plates pivotally attached to the first plate, and adjustable to positions in which the line of its outer edge intersects the line of the gaging edge of the base.

Signed by me at Boston, Massachusetts, this 14th day of February, 1914.

REUBEN M. RAYMOND.

Witnesses:
G. WRIGHT ARNOLD,
JOSEPHINE H. RYAN.